June 22, 1926.
J. KEMP
1,590,035
SOIL SCREEN FOR PLOWS
Filed Nov. 1, 1924
2 Sheets-Sheet 2
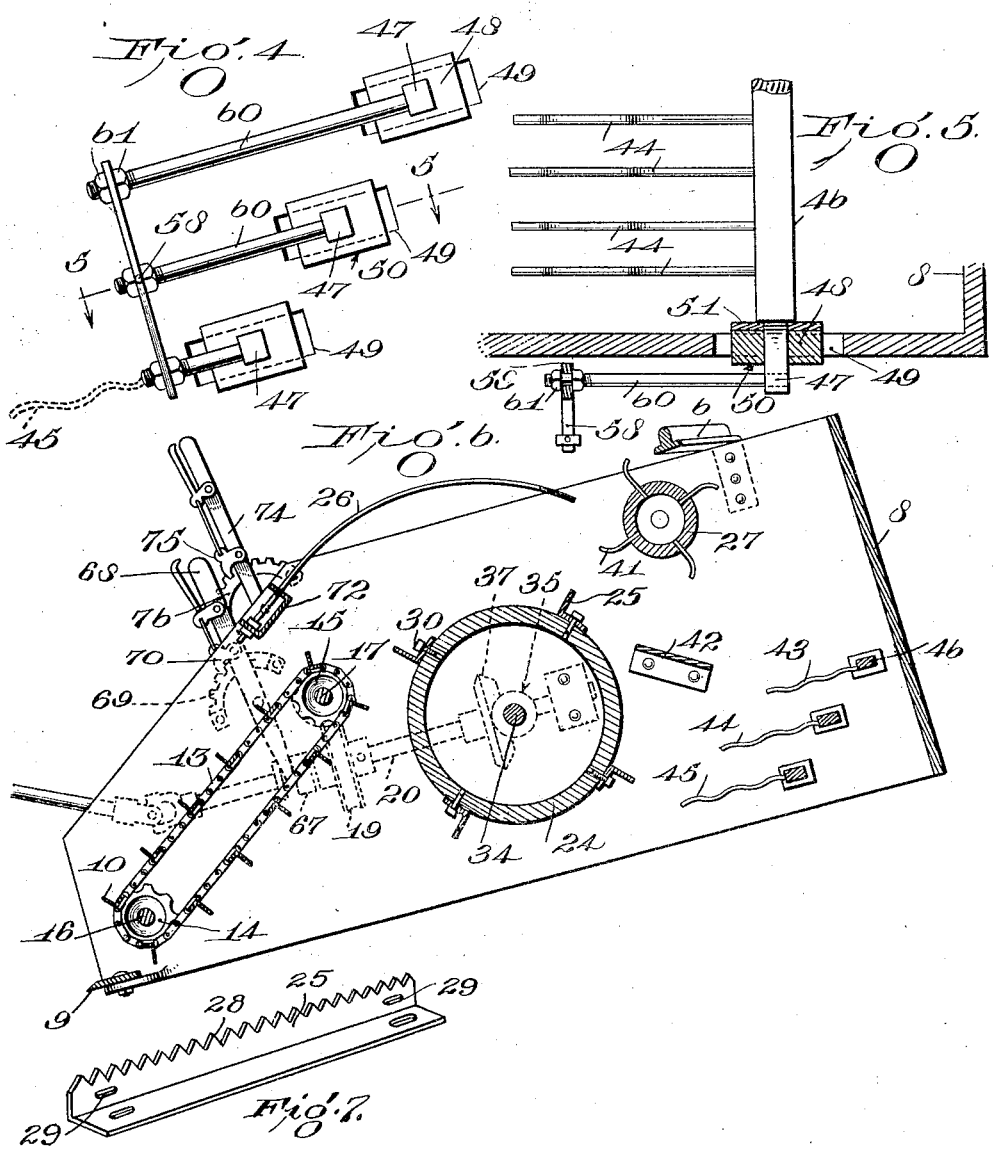
WITNESSES
INVENTOR
John Kemp
BY
ATTORNEYS Patented June 22, 1926.

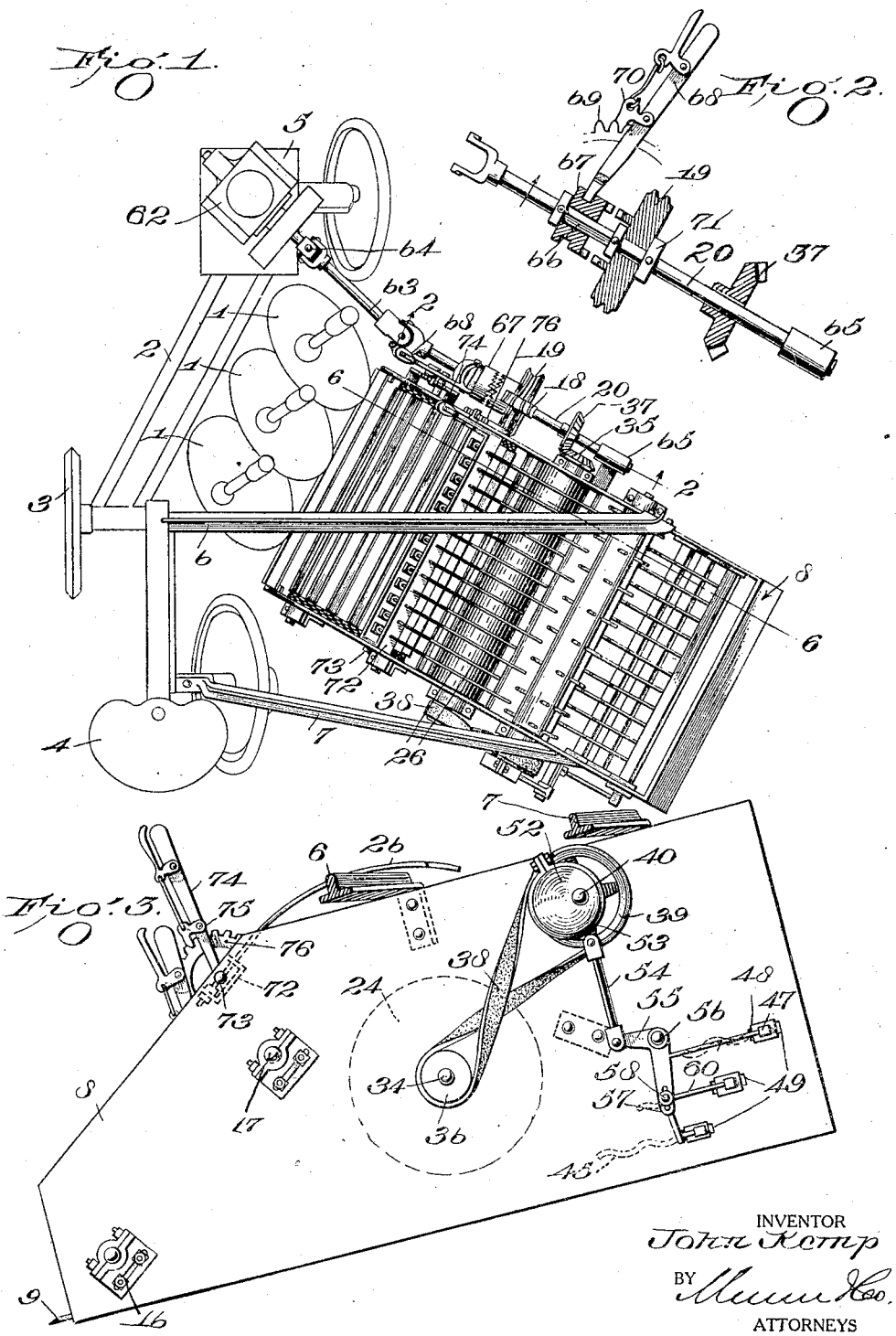

1,590,035

UNITED STATES PATENT OFFICE.

JOHN KEMP, OF DAHLEN, NORTH DAKOTA.

SOIL SCREEN FOR PLOWS.

Application filed November 1, 1924. Serial No. 747,246.

This invention relates to improvements in plows, and it consists of the constructions, combinations and arrangements herein described and claimed.

An object of the invention is to provide an attachment for plows which is arranged to be held in such position that the furrows can be turned directly upon the attachment so that the resulting screening operation may separate the rubbish consisting of weeds, etc. from the soil, leaving the former on top of the ground surface for subsequent removal.

Another object of the invention is to provide a screening mechanism which may be attached to a disk or other type of plow for the purpose of receiving the ground turned up by the plow and so agitate it as to loosen the ground from the roots of various kinds before being discharged.

Another object of the invention is to provide an attachment for plows, arranged to be mechanically driven separately from the plow and having arrangements for receiving and agitating the earth turned up by the plow and discharging the earth in more or less divided or broken state, and the weeds, etc. in a separated condition so that they may dry on the surface of the ground.

Other objects and advantages will appear in the following specification, reference being had to the accompanying drawings, in which Figure 1 is a plan view illustrating the application of the screening attachment to a conventional disc plow.

Figure 2 is a detail section of the main drive shaft, taken substantially on the line 2—2 of Figure 1.

Figure 3 is a side elevation of the soil screen.

Figure 4 is a detail view illustrating the connections of reciprocating racks.

Figure 5 is a detail sectional view on the line 5—5 of Figure 4 illustrating one of the sliding blocks of one of the reciprocating racks.

Figure 6 is a substantially central section taken on the line 6—6 of Figure 1.

Figure 7 is a detail perspective view of one of the agitating cylinder angle jaws.

One of the outstanding purposes of the invention is to clear the soil, in a large measure at least, of roots of weeds, grass, and all other undesirable growths, leaving such roots on top of the ground where they are exposed to the air and sun and caused to dry. A particular use of the invention is that of the elimination of quack grass. The roots of this grass are very tenacious and the resulting growth of grass is very hard to get rid of. These roots can be brought to the surface when plowing, but obviously if they are left in the soil they will only begin to grow again, probably more vigorously than before. By the use of the invention, these and other roots are separated from the soil and left to dry so that no harm can come of them.

In Figure 1 the invention is shown in connection with a disk plow. The plow in this case has three disks 1. Obviously the number of disks in the plow has nothing to do with the invention, and the plow may be of a type other than disk. The plow includes a frame 2, wheels 3, seat 4 and draw plate 5. It is to this plate that either the horses or tractor are hitched.

Extending from the frame 2 of the plow are two or more strong bars 6 and 7. These are firmly anchored upon the plow frame and at the opposite ends are attached to the casing 8 of the improved soil screen. The term "soil screen" is adopted because of its separating action upon the soil. The soil is subjected to considerable agitation so that it is bound to fall loose from the roots, the latter being given a final shaking so that they may drop to the ground with very little, if any, soil adhering to them.

The casing 8 has a shoe 9 which is placed close to the disks 1, or in other words placed so that the soil turned up by the disks will fall directly upon the shoe and upon an elevator which includes the angle irons 10. These angle irons 10 are secured to certain links of chains 13 in any suitable manner. The chains run over pairs of sprockets 14 and 15 upon lower and upper shafts 16 and 17, the latter carrying a worm pinion 18 (Fig. 1) meshing with and being driven by a worm gear 19 on the main drive shaft 20.

So situated within the casing 8 that the elevator may discharge thereupon is a cylinder 24. This cylinder is provided with a plurality of longitudinal angle jaws 25 (Fig.

7) for the purpose of throwing the soil upward against the hooks 26 and towards an auxiliary agitating cylinder 27. The jaws 25 are made of angle iron, one edge of each being serrated at 28, the other edge being smooth. Both portions or flanges of each jaw are provided with slots 29 to receive the securing bolts 30. The jaws are reversible upon the cylinder 24 so that either smooth or serrated edges may be presented to the soil.

A shaft 34 carries the cylinder 24. This shaft is suitably journaled upon the casing 8. At one end it carries a beveled pinion 35 (Fig. 1) and at the other end a pulley 36 (Fig. 3). The pinion 35 meshes with a gear 37 which is keyed to the shaft 20 so that the cylinder 24 may be driven simultaneously with the elevator.

Driving power is communicated to the auxiliary cylinder 27 from the shaft 34 by a belt 38 (Fig. 3) which is applied both to the pulley 36, mentioned before, and to a pulley 39 on the shaft 40 by which the auxiliary cylinder is carried. In practice the belt connection 38 may be substituted by an intermediate shaft and bevel gear connection. Such arrangement is so common and obvious that detailed illustration is regarded unnecessary. The cylinder 27 carries a plurality of prongs 41 which are bent backward as regards the direction of rotation of the cylinder (Fig. 6). The purpose of these prongs is to both strike and break the soil and at the same time move it downward upon the guard or pan 42 which is fixed crosswise of the casing 8.

This pan discharges upon a shaking arrangement consisting of racks 43, 44 and 45. These racks are composed of crooked rods set in parallelism in bars 46. These bars are made non-circular at one end, as at 47, (Fig. 5) and project through slide blocks 48 which occupy rectangular slots 49 in the sides of the casing 8. The blocks are suitably flanged at 50 and provided with inside cover plates 51 to keep them in place in the slots. It is to be understood that the arrangement shown in Figure 5 occurs only at one end of each of the bars 46 because it is at this end (nearest the observer in Figs. 3, 4 and 5) that the reciprocating mechanism occurs.

The slide blocks constitute the mountings from which the bars extend straight across the casing 8, the opposite ends of the bars being free.

This mechanism consists first of an eccentric 52 fixed upon the adjacent end of the shaft 40. The eccentric has a shaft 53 which has a link connection 54 with a bell-crank 55 pivoted at 56 upon the side of the casing. The slotted extremity 57 of the bell-crank receives the wrist pin 58 (Fig. 5) of a connector bar 59 to which the various rods 60 of the bars 46 are connected by nuts 61 or equivalent means. Rocking of the bell-crank 55 causes reciprocation of the various racks so that the material lying thereupon is thoroughly shaken for the purpose intended.

It is to be noted that the racks 43, 44 and 45 are in stepped relationship, that is to say the various racks project forwardly in progressive arrangement, the lowermost rack 45 coming well beneath the guard or pan 42. The purpose of this arrangement is this: As the uppermost rack 43 discharges material thereon upon the next rack 44, such material is still subjected to the shaking action before it is discharged upon the next rack. A thorough shaking of the roots, etc. occurs so that the soil is thoroughly loosened therefrom. The roots are finally discharged by the last rack 45, and they thereupon lie on top of the ground to ultimately dry. The bottom of the casing 8 is preferably open to a large extent so that the soil may drop through at various places and not impose too great a load upon the racks.

Driving power for the main shaft 20 is furnished by a small gasoline engine 62 (Fig. 1) mounted upon the draw plate 5. The engine is used in case the plow 2 is drawn by horse power. The use of tractors has also become so prevalent that in practice provision is also made of a coupling of some kind from which power may be taken off at the rear of a tractor. If this type of tractor be used to draw the plow 2 it is readily conceivable that the shaft 20 may be driven from this source rather than from the engine 62. However, it is not essential to show more than one mode of driving the shaft 20 and for this reason the engine 62 has been adopted.

A connecting rod 63 with universal joints 64 at each end provides the link between the engine shaft and the drive shaft 20. The latter is suitably journaled in bearings 65 on the side of the casing 8. The shaft includes a non-circular portion 66 (Fig. 2) upon which a clutch element 67 is slidable by means of a lever 68 which is capable of being held in position by a conventional quadrant and detent arrangement, as shown at 69 and 70 respectively. The worm gear 19 is loose upon the shaft 20 but is held in position by collars 71. Both the clutch elements and worm gear 19 have clutch faces which, upon being brought into engagement by the lever 68, provide a driving connection between the shaft 20 and the worm gear.

In reference to the weed hooks 26 it is to be observed in Figures 3 and 6 that they are adjustable as to height in respect to the cylinder 24. These hooks are alternately long and short. They are suitably mounted in a channel iron 72 which is suitably mounted at 73 in the sides of the casing. A lever 74 has such connection with the channel iron 72 that the latter may be rocked upon its pivotal bearing upon unloosening the detent 75 from the quadrant 76 and thereby adjust the weed hooks 26 to the desired height.

The operation.

The reader doubtless fully understands that the soil of a tillable field is often full of undesired weeds, grass, thistle and other roots which, if not exterminated, will continue to grow to the endless worry of the farmer. The obvious mode of exterminating roots is to pull them out of the ground and let them dry. This is very impracticable in large fields, and the result is that the roots continue to grow. The invention consists of a mechanism through which the soil is intended to pass as it is plowed up, there being the cylinder 24 for tossing the soil up against the weed hooks 26, the elevator 10—13 for elevating the soil to the cylinder, the cylinder 27 for further agitating the soil and directing it downward upon the pan 42, and the series of racks 43, 44 and 45 for finally shaking the roots to loosen every possible particle of soil.

It is not the intention of the invention to lay the roots aside. The purpose is merely to shake the soil loose and to deposit the roots on top of the ground. There they may dry and will do no harm, or if desired, they may be gathered for burning.

The cylinders 24 and 27 are operated continuously when the shaft 20 is in motion. This shaft is driven directly from the engine 62. It is necessary to throw the clutch lever 68 forward in order to start the elevator 10—13. Upon thus throwing the clutch lever the clutch 67 is brought into engagement with the worm gear 19 so that the upper shaft 17 (Fig. 3) of the elevator is rotated. The lever 74 (Fig. 6) is for the purpose of raising and lowering the weed hooks 26. As stated before, it is against these that the angle jaws 25 on the cylinder 24 throw the soil, and it is also against these that the initial breaking action of the soil occurs. The prongs 41 of the cylinder 27, and the various racks, complete the work, the crookedness of the rack rods preventing the roots, etc. from sliding from one to the other too quickly.

While the construction and arrangement of the improved soil screening apparatus is of a generally preferred form, obviously modifications and changes may be made without departing from the spirit of the invention or the scope of the claims.

I claim:—

1. A device of the character described for throwing soil comprising a casing a series of racks in said casing in stepped arrangement, each rack being composed of a plurality of crooked rods and including bars upon which the rods are mounted, means including blocks through which the bars pass and by which the racks are slidably mounted upon the casing, a revoluble cylinder carrying means to throw soil rearwardly toward the tracks, an eccentric driven by said cylinder; a pivoted bell-crank, a connection between one arm of the bell-crank and the eccentric for rocking the former, and connections between the other arm of the bell-crank and said racks for reciprocating the latter, said connections including a connecting bar and a series of rods extending to the rack bars.

2. A device of the character described including a casing having a wall slotted at a plurality of places, a series of racks including bars situated in the casing and projecting through said slots, rectangular blocks in which the ends of the rods are fixed and arranged to slide in said slots, said blocks being of ample proportions to prevent binding thereof in the slots, and means having common connection with all of the blocks for reciprocating the racks.

3. In combination with a revoluble cylinder having means for throwing soil discharged thereupon, a plurality of reciprocatory racks arranged progressively nearer to the cylinder to present a stepped arrangement, means situated in the passage between said cylinder and racks for directing the soil to the uppermost rack, an auxiliary cylinder having means for urging the soil over said means, and means by which the racks are driven from said auxiliary cylinder.

JOHN KEMP.